United States Patent [19]
Morgan

[11] Patent Number: 4,631,627

[45] Date of Patent: Dec. 23, 1986

[54] IMPULSE OPERATED RELAY SYSTEM

[76] Inventor: Ronald E. Morgan, 5900 SE. Yamhill, Portland, Oreg. 97215

[21] Appl. No.: 732,520

[22] Filed: May 9, 1985

[51] Int. Cl.[4] .......... H02N 7/22

[52] U.S. Cl. .......... 361/153; 361/186

[58] Field of Search .......... 361/153, 186, 189, 209, 361/190

[56] References Cited

U.S. PATENT DOCUMENTS 1,939,071 12/1933 Long .
2,434,948 1/1948 Miller .
2,487,010 11/1949 Wild .
2,678,411 5/1954 Hufnagel .
2,705,297 3/1955 Koch .
2,718,613 9/1955 Harris .
2,854,613 9/1958 Mowery, Jr. .
2,877,387 3/1959 Loudon et al. .
3,019,374 1/1962 Ladd, Jr. .
3,150,294 9/1964 Dastidar .
3,206,653 9/1965 MacArthur .
3,211,963 10/1965 Van Ness .
3,278,810 10/1966 Halpin .
3,375,412 3/1968 Bridges .
3,406,295 10/1968 Corey .
3,812,382 5/1974 Pascente .
3,849,699 11/1974 Roche .
3,889,168 6/1975 Onishi et al. .
3,931,550 1/1976 Dalpee .......... 361/186
4,054,935 10/1977 Ginsberg .
4,112,342 9/1978 Elliott .
4,125,885 11/1978 Lowther et al. .
4,153,922 5/1979 Azuma et al. .
4,224,654 9/1980 Goldthrop et al. .
4,468,715 8/1984 Rene, Jr. .......... 361/186
4,502,090 2/1985 Sloan .......... 361/190 X

FOREIGN PATENT DOCUMENTS 2753765 6/1978 Fed. Rep. of Germany .

*Primary Examiner*—Michael L. Gellner

[57] ABSTRACT

A relay control system is disclosed for alternately energizing and deenergizing a non-latching relay in response to successive applications of an AC impulse control signal to a control signal input. An impulse processing circuit converts the AC impulse control signal into a DC pulse. The DC pulse toggles a first flip-flop. The output from the first flip-flop is gated through a second flip-flop in response to a clock signal produced by an AC zero-crossing detector to synchronize the second flip-flop output with zero-crossings of the AC power signal. The output from the second flip-flop operates driving circuitry which energizes and deenergizes the relay coil, thereby toggling the relay. A power up reset circuit deenergizes the relay in response to the initiation of the AC power signal and presets the logic circuitry so that the next impulse of the AC control signal will energize the relay.

18 Claims, 16 Drawing Figures

IMPULSE OPERATED RELAY SYSTEM

TECHNICAL FIELD

The present invention relates generally to relays and in particular to relays utilized in industrial process control applications.

BACKGROUND OF THE INVENTION

Industrial process controllers often use a variety of complex relay control systems to operate electrical equipment. Spring biased, self-sealing and magnetic latching relays, together with their associated control circuitry, are in widespread use throughout the industrial process control industry. Certain control operations, however, are so complex that presently-known relay-based topologies are impracticable or impossible. One example of such an operation is that control of a conveyor by three or more operators, each of whom needs to be able independently to start or stop the conveyor with the momentary closure of a foot switch. No practicable relay topology can implement such a system. In such situations, resort must be made to computer-based controllers.

Computer-based controllers are increasingly being utilized to implement otherwise impracticable industrial process control systems. Although effective, such controllers are expensive and require substantial time and expertise to program.

A generally applicable limitation on industrial relay control systems is that the equipment powered through the relay should come up unenergized when AC power is first restored after having been interrupted. There are two reasons for this limitation. One is that maintenance workers may be working on the equipment while the power is off. If power is inadvertently or unexpectedly reapplied, the workers can be seriously injured. The other reason is that the industrial equipment can be damaged by the voltage transients that generally accompany the reenergization of AC power distribution systems. Such transients can exceed the voltage ratings of the equipment, necessitating costly repairs. Although AC power outages can be minimized, they cannot be totally prevented. Accordingly, it is desirable in industrial applications to plan for the possibility of Ac power interruptions and to design control circuitry so that equipment comes up in its unenergized state when AC power is restored.

The nature of the control signals used also may impose limitations on the control system. For example, if momentary contact foot switches are used to control equipment, the control system must respond to an impulse, rather than to a continuous control signal. Latching relays are typically used in such applications, but, in case of a power interruption, such relays assume their last state when power is restored, with the attendant dangers mentioned above.

The nature of the industrial equipment being controlled can also dictate specialized limitations on the relay control system. The switching of AC power to certain machines in synchronization with the zero-crossings of the AC power signal is one such limitation. Since many industrial machines present a highly-inductive load to the AC power system, they present a very low impedance and draw a correspondingly large surge of current when fist energized. If such a machine is energized at the peak of the AC power signal, the current transient can exceed the current rating of the supply system, causing a power system circuit breaker to open. To assure an uninterrupted supply of power to the machinery, the switching of large industrial equipment should be synchronized with the zero-crossings of the AC power signal. Conventional relays are ill suited to switch such machinery since their contact closures are random with respect to the phase of the AC power signal.

RELATED ART

The relay art discloses relay operating systems that operate a non-latching relay in response to momentary closure of a control circuit. U.S. Pat. No. 2,678,411 to Hufnagel shows one such system in which a momentarily closed control contact completes a capacitor charging circuit. The relay coil is operated from the stored voltage of the capacitor and remains energized until the capacitor charge drains off through the relay coil.

A non-latching relay circuit operated by a momentary control signal relay is shown in U.S. Pat. No. 2,434,948 to Miller. A momentary impulse signal is fed to the grid of a vacuum tube, causing the plate circuit to draw current through a relay coil. A dedicated contact of the closed relay connects an RC series circuit from the vacuum tube plate to ground. This RC circuit continues to draw current through the relay coil until the capacitor is charged and then current flow stops. The relay is then deenergized.

Relay operating systems such as those described above all rely on resistor-capacitor delay circuits to maintain a relay in its energized state after the activating control signal is removed. Such relay systems return spontaneously to their non-energized state after a fixed period of time. Relay switching in such systems is thus not synchronized with the zero-crossings of an AC power signal. Nor do any of these systems affirmatively reset the relay when power is first applied.

Relay-based flip-flops known in the art also utilize a charge stored on a capacitor to activate the relay. U.S. Pat. No. 3,206,653 to MacArthur shows a latching relay flip-flop in which the output of the relay is fed back to the driver coil through a pair of resistor-capacitor networks. An external clock signal periodically shorts the capacitors to ground through a switching diode, causing current to flow through the relay coil in alternating directions, thereby latching and unlatching the relay.

U.S. Pat. No. 2,877,387 to Loudon et al. discloses a thyratron/relay-based flip-flop system in which successive closures of a switch alternately energizes and deenergizes a non-latching relay. One limitation of such a system is that the relay must have two poles dedicated to internal circuit functions. Furthermore, the circuit topology precludes adding additional paralleled switches to toggle the circuit from several remote locations.

The MacArthur and Loudon et al. systems again both lack the synchronized switching and power-up reset features that are desirable in industrial control relay applications.

A zero-crossing detector used to synchronize circuit functions with zero-crossings of an AC power signal is disclosed in U.S. Pat. No. 3,812,382 to Pascente. The Pascente detector uses a full-wave rectifier to drive an inverter stage, thereby producing positive output pulses in response to zero-crossings of the AC input signal. A similar zero-crossing detector that compares a pulsating output voltage from a bridge rectifier to a fixed reference voltage is described in U.S. Pat. No. 4,153,922 to Azuma, et al. The Azuma, et al. zero-crossing detector is incorporated into a relay control circuit that swtiches, by 180°, the phase of an AC power signal being switched through the relay contacts each time the relay is energized. By alternating the direction of current flow each time the relay contacts are closed, welding of the contacts is avoided. Azuma, et al. does not automatically reset the relay when power is initially applied, nor does it provide for input of control signals from a plurality of remote locations.

Accordingly, a need remains for an industrial control relay actuable by an impulse control signal from one or more sources and having AC synchronizable switching and power-up reset capabilities.

SUMMARY OF THE INVENTION

One object of the present invention is to provide a versatile industrial control relay.

A second object of the present invention is to enable implementation of heretofore impracticable relay topologies.

Another object of the present invention is to provide an impulse operable relay that can be toggled by an impulse of an AC control signal.

A further object of the present invention is to provide an impulse operable relay that can be toggled from a plurality of remote locations using a single-pole, single-throw momentary contact switch.

An additional object of the present invention is to provide a relay having AC synchronized switching.

Yet a further object of the present invention is to provide a relay having a power-up reset.

Another object of the present invention is to enable implementation of a motor control circuit by which a plurality of operators can independently start and stop the motor by momentary actuation of a switch.

A further object of the present invention is to enable implementation of a two motor reversible system control circuit using only two relays.

The present invention is a control circuit for alternately energizing and deenergizing a non-latching relay in response to successive applications of an AC control signal to a control signal input. An AC power input line and an AC control input line are provided to the impulse relay control circuit. Logic circuit means is provided for alternately energizing and deenergizing the relay in response to successive momentary applications of the AC control signal. A power-up reset circuit deenergizes the relay in response to the initiation of AC power and presets the logic circuitry so that a first subsequent impulse of AC control signal will energize the relay. Preferably, a one-bit shift register circuit is provided between the logic means and the relay for synchronizing operation of the relay with a zero-crossing of the AC power signal.

The foregoing and additional objects, features, and advantages of the present invention will be more readily apparent from the following detailed description of a preferred embodiment and applications thereof which proceeds with reference to the accompanying drawings.

DETAILED DESCRIPTION OF THE PREFERRED EMBODIMENTS

Functional Overview

Figure 1:
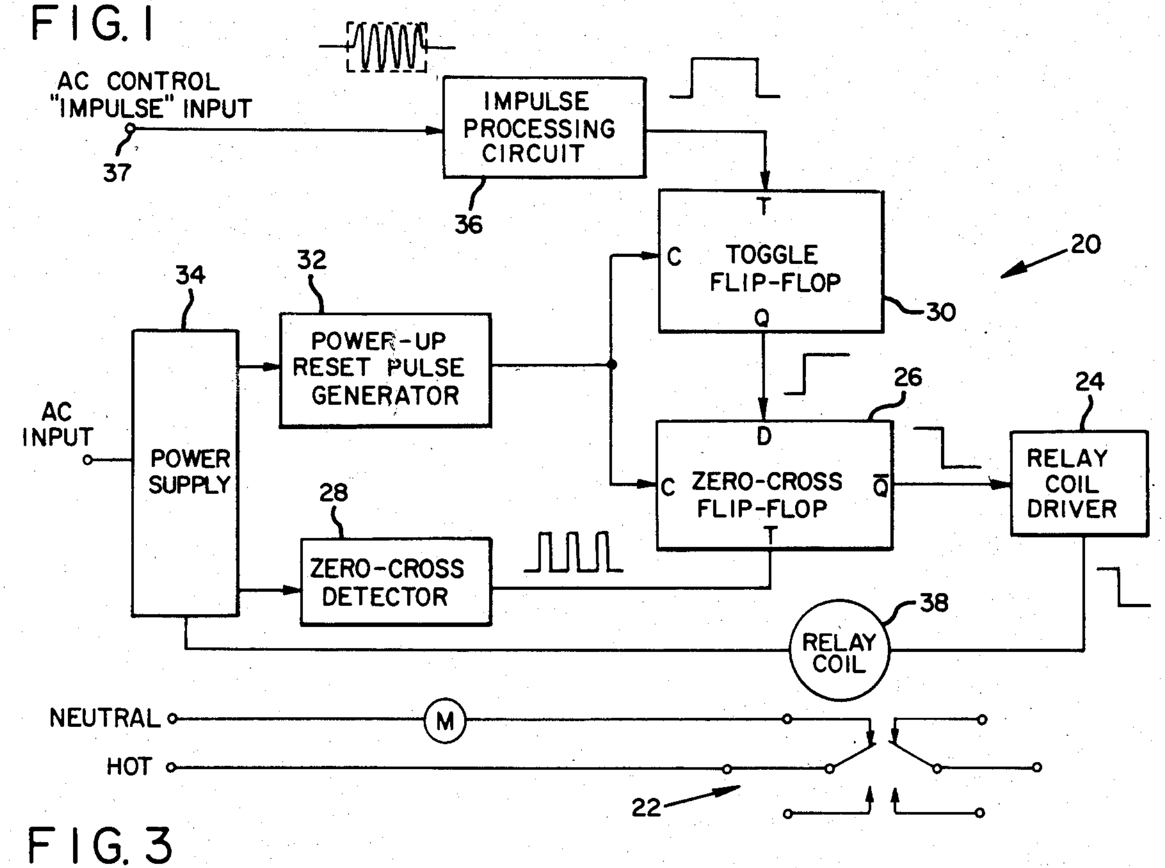
FIG. 1 is a block diagram of an AC impulse-operated relay control circuit according to the present invention.

As shown in FIG. 1, the preferred embodiment of the impulse relay 20 of the present invention includes a relay 22, a relay coil driver 24, a zero-cross flip-flop 26, a zero-cross detector 28, a toggle flip-flop 30, a power-up reset pulse generator 32, a power supply 34 and an impulse processing circuit 36. These elements in combination alternately energize and deenergize the relay coil in response to successive applications of an AC control signal to a control signal input 37 of the circuit.

The control signal used to operate the impulse relay is a short burst or envelope of AC signal, coupled to the circuit from an AC power line through a momentary contact switch. Impulse processing circuit 36 converts this AC control signal into a DC logic signal which is compatible with the subsequent stages.

The processed DC pulse is fed to the input of toggle flip-flop 30, which changes its output state each time a pulse is received at its input. The output of toggle flip-flop 30 is fed to the input of a second, zero-cross flip-flop 26. Zero-cross flip-flop 26 gates the output of the first flip-flop 30 to its own output each time a clock pulse arrives at its clock input. The output of zero-cross flip-flop 26 is fed to a relay coil driver 24 which drives a relay coil 38 in relay 22.

The source of clock pulses input to the zero-cross flip-flop is, in the preferred embodiment, zero-cross detector 28, which detects zero-crossings of the AC power input signal. Such circuit causes zero-cross flip-flop 26, and consequently relay 22, to change state in synchronization with the zero-crossing of the AC power signal. This synchronization prevents switching of high current inductive loads at the peak of the AC cycle. Alternatively, zero-cross flip-flop 26 can be clocked by some other clock source, such as by an astable multivibrator which is synchronized with some other system parameter.

Power-up reset pulse generator 32 deenergizes relay coil 38 of relay 22 when AC power is first reapplied after having been interrupted. This reset function prevents damage to the industrial equipment powered through relay 22 caused by a transient surge on the power signal. The reset feature likewise prevents harm to maintenance personnel caused by the unexpected activation of the equipment.

Power-up reset pulse generator 32 is connected to power supply 34 and senses the initiationof an AC signal after power has been interrupted. Upon detecting initiation of an AC signal, pulse generator 32 sends a reset pulse to the clear inputs of flip-flops 26 and 30, causing their outputs to clear. The reset pulse also serves to preset flip-flops 26 and 30 so that the next impulse from impulse processing circuit 36 will toggle relay coil 38 on.

Figure 3:
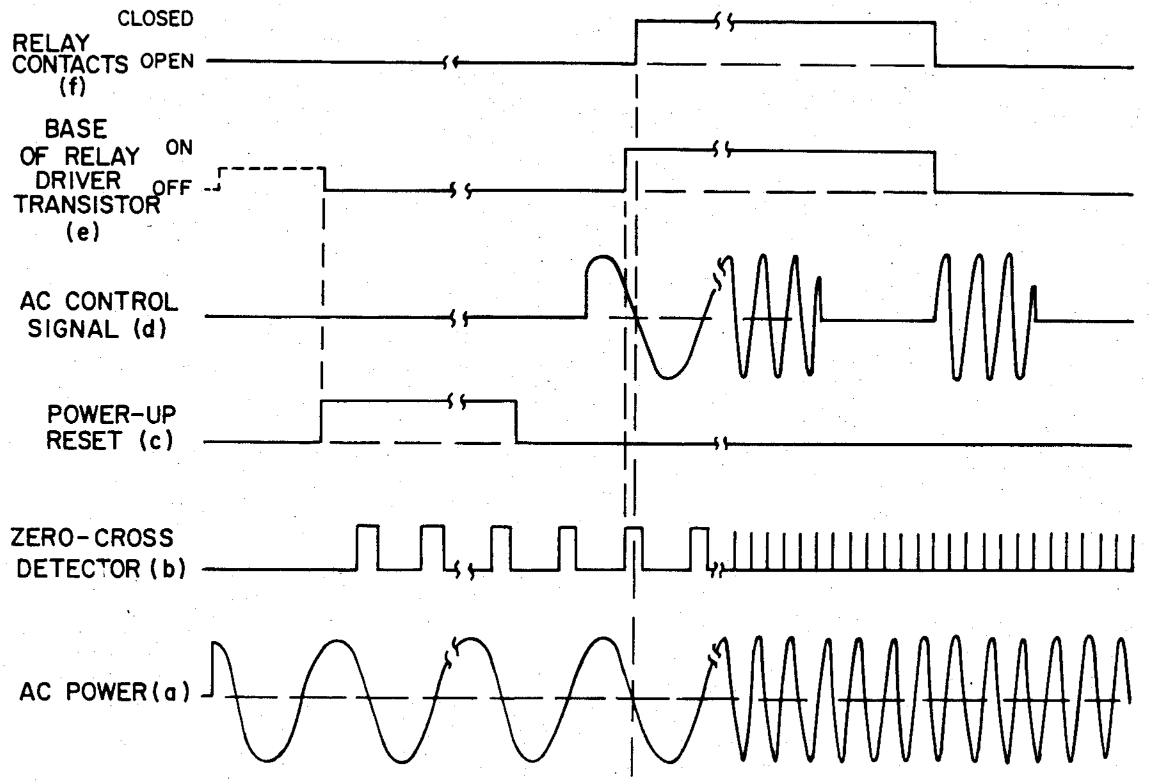
FIG. 3 is a timing diagram showing the interrelationships of various signals in the impulse relay control circuit of FIG. 1.

The cooperation between these functional units is illustrated by the timing diagram of FIG. 3. Before AC power, line (a), is applied to the system, all voltages are zero. When AC power is first applied, there is as short delay before power supply 34 begins supplying five volts to the system's logic circuitry. The length of this delay is dependent on the size of the power supply filter capacitors and on the initial phase of the AC power signal. The system's logic circuitry will not operate until the output from this five volt supply rises above the logic circuitry's threshold operating voltage.

As the output from the five volt supply rises toward five volts, the states of flip-flops 26 and 30 will be indeterminate. These states can depend on several factors, including random system noise and logic switching thresholds. The state of relay driver circuit 24 will likewise be unpredictable, as illustrated by the dashed line on line (e).

As soon as the output from the five volt supply rises above the threshold operating voltage of the logic circuitry, power-up reset pulse generator 32 will send a reset pulse to flip-flops 26 and 30 to clear and preset these circuits so that the next input pulse will toggle relay 22 on. This reset pulse, shown on line (c), begins as soon as the five volt power line rises above the logic threshold operating voltage. The pulse continues for a duration dependent on the values of resistor and capacitor timing components in pulse generator circuit 32. The system cannot be toggled until this reset pulse terminates.

Zero-crossing detector 28 likewise begins functioning as soon as the output from the five volt supply rises above the logic circuitry's threshold operating voltage. As shown by line (b) of FIG. 3, the zero-crossing detector output pulse begins a short length of time before the precise zero-crossing of the AC power signal. This length of time is dependent on the value of certain components, described later. The zero-crossing detector output pulse likewise does not terminate until a short time after the power signal zero-crossing.

When, after the power-up reset pulse has terminated, an AC control signal is applied to the system's control signal input, as shown on line (d), toggle flip-flop 30 will toggle from its preset low state to a high state. This high state is applied to the input of zero-cross flip-flop 26. Zero-cross flip-flop 26 acts as a one bit shift register and will only gate this high input to relay coil driver 24 when flip-flop 26 is clocked by a pulse from zero-cross detector 28. Thus, line (e) of FIG. 3 shows that relay coil driver 24 is not energized upon the application of the AC control signal, but rather is energized in synchronism with the leading edge of the next output pulse from zero-crossing detector 28 following application of the AC control signal.

As noted above, the zero-crossing detector output pulse begins a short length of time before the precise zero-crossing of the AC power signal. Relay coil driver circuit 24 is likewise activated before the zero-crossing. This short length of time is chosen to match the pull-in delay of the contacts of relay 22, so that the relay contacts close in synchronization with the zero-crossing, as shown by line (f).

Figure 2:
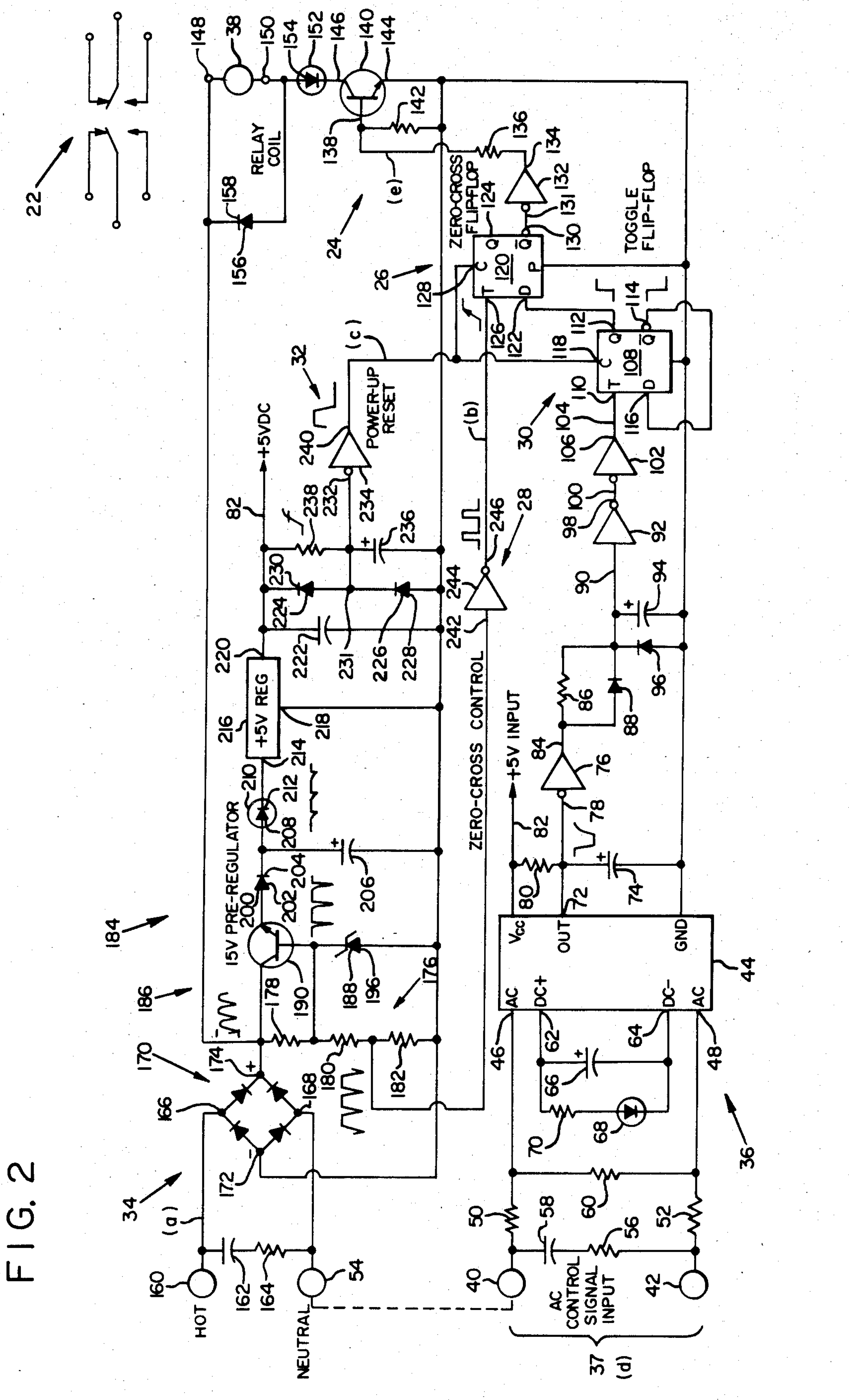
FIG. 2 is a schematic diagram of the preferred embodiment of the circuit of FIG. 1.

The detailed operation of the functional units is described in the following discussion, which proceeds with reference to the schematic diagram of FIG. 2.

Impulse Processing Circuit

Impulse processing circuit 36 converts an impulse of the AC control signal fed to the AC control signal input 37 into a DC pulse signal. In the preferred embodiment, the impulse processing circuit employs a Hewlett-Packard 3700 integrated circuit 44.

The AC control signal is connected to the system's AC control signal input terminals 40, 42 and is coupled to the AC inputs 46 and 48 of integrated circuit 44 through two 4.7 kilohm resistors 50 and 52. One of input terminals 40 and 42 may be connected to the neutral 54 of the AC wiring system, so that only a single external connection need be made between the remote switches and the impulse relay operating circuit 20. AC control input terminals 40, 42 are shunted by a series combination of a 39 ohm resistor 56 and a 0.68 microfarad capacitor 58. AC inputs 46 and 48 of integrated circuit 44 are shunted by a 2.2 kilohm resistor 60.

Circuit 44 has DC+ and DC− outputs 62, 64 connected across a ten microfarad electrolytic capacitor 66 and across the series combination of a red light-emitting diode 68 and a 510 ohm resistor 70. The cathode of light-emitting diode 68 is connected to DC− output 64. Light-emitting diode 68 signals the processing of an AC control signal.

Circuit 44 has an output terminal 72 shunted to ground by a 10 microfarad AC filtering capacitor 74 and supplies a rectified DC pulse output signal to the input 78 of a HC14 CMOS Schmitt-trigger inverter 76. Input 78 of inverter 76 is also connected through a 4.7 kilohm resistor 80 to a five volt power line 82. Inverter 76 serves as a pulse shaper circuit.

The output 84 of inverter 76 is fed through a shunt combination of a forty-seven kilohm resistor 86 and a 1N4148 diode 88 to the input 90 of a second HC14 CMOS Schmitt-trigger inverter 92. Shunted to ground across input 90 of second inverter 92 is a 1.5 microfarad tantalum-dipped capacitor 94 and a second 1N4148 diode 96. The cathode of diode 96 is connected to ground. Resistor 86, diodes 88 and 96, capacitor 94 and inverter 92 act as a delay on debounce circuit. The output 98 of second inverter 92 drives the input 100 of a third HC14 CMOS Schmitt-trigger inverter 102. The output 104 of impulse processing circuit 36 is taken from the output 106 of third inverter 102, and provides a squared-off logic high pulse in response to the momentary application of an AC control signal to the AC control signal inputs 40, 42.

Toggle Flip-Flop

Toggle flip-flop circuit 30 provides an output signal that serves to alternately energize and deenergize relay coil 38 in response to successive pulses received at its input 110 from impulse processing circuit 36.

Toggle flip-flop 30 of the preferred embodiment employs a 4013 D-type flip-flop integrated circuit 108, configured as a toggle stage. The clock (T) input 110 of integrated circuit 108 is connected to output 104 of impulse processing circuit 36. The output signal from integrated circuit 108 is taken from its Q output 112. The non-Q output 114 is fed back and connected to the D input 116. The clear input 118 of integrated circuit 108 is connected to an ouput of power-up reset pulse generator 32, described later.

Toggle flip-flop 30 serves to alternately change the state of Q output 112 in response to successive input pulses applied to T input 110. The first pulse applied to T input 110 after integrated circuit 108 has been cleared causes Q output 112 to change from a logic low level to a logic high level. The next pulse applied to T output 110 causes Q output 112 of integrated circuit 108 to change back from a logic high level to a logic low level. Toggle flip-flop circuit 30 continues to alternate output states in response to successive input pulses.

Zero-Cross Flip-Flop

Zero-cross flip-flop circuit 26 serves to synchronize the operation of relay 22 with zero-crossings of the AC power signal. This synchronization is effected by delaying transmission of the toggle flip-flop output signal to coil driver circuitry 24 until zero-crossing detector 28 detects a zero-crossing of the AC power signal.

Zero-cross flip-flop 26 also employs a 4013 D-type flip-flop integrated circuit 120 and is configured as a latch or one bit shift register stage. The output signal from Q output 112 of toggle flip-flop 30 is applied to the D input 122 of integrated circuit 120. This signal is gated to the Q output 124 of integrated circuit 120 when a clock pulse arrives at the T input 126. Circuit 26 thus functions to delay transmission of the logic signal present on Q output 112 of toggle flip-flop 30 to Q output 124 of zero-cross flip-flop 26 until a pulse is received at T input 126 of zero-cross flip-flop 26. The clear input 128 of integrated circuit 120 is again connected to power-up reset pulse generator 32, described later. The output signal from zero-cross flip-flop circuit 26 is taken from the non-Q output 130 of integrated circuit 120. Integrated circuit 120 thus also serves as an inverter stage. The Q output 124 is left unconnected.

Relay Coil Driver

Relay coil driver circuit 24 takes the logic signal produced by zero-cross flip-flop circuit 26 and uses it to drive relay coil 38.

The output signal produced by the non-Q output 130 of zero-cross flip-flop 26 changes from a logic high level to a logic low level when relay coil 38 is to be activated. The zero-cross flip-flop output signal from not-Q output 130 is fed to the input 131 of a HC14 CMOS Schmitt-trigger inverter 132 which transforms the high/low signal transition into a low/high transition.

The output 134 from inverter 132 is fed through a 2.2 kilohm resistor 136 to the base 138 of a MPS A42 transistor 140. A 510 ohm resistor 142 is shunted across base 138 to ground. The emitter 144 of transistor 140 is tied to ground. The transition to logic high on base 138 of transistor 140 serves to bring the collector 146 substantially to ground, thus allowing current to pass through transistor 140 to ground.

A power supply terminal 148 of relay coil 38 is connected to power supply 34. The other, switched terminal 150 of relay coil 38, is connected to collector 146 of transistor 140 through a red light-emitting diode 152. The anode 154 of light-emitting diode 152 is connected to the switched terminal 150 of relay coil 38. When transistor 140 turns on and collector 146 goes to ground, current is allowed to flow from power supply 34, through relay coil 38, through light-emitting diode 152 and to ground, thereby energizing relay coil 38. Light-emitting diode 152 indicated the energization of relay coil 38. A 1N4005 diode 156 is connected across relay coil 38, with its cathode 158 connected to power supply terminal 148, to shunt tne negative voltage transient induced in the coil when current flow is interrupted.

Relay 22 may be of any type. In the preferred embodiment a double pole, double throw relay having a 110 volt DC coil is used.

Power Supply

Power suppy 34 of impulse relay control circuit 20 converts an AC input power signal into the DC operating voltages required by the various subcircuits. Circuitry is also provided to facilitate implementation of power-up reset pulse generator 32 and zero-cross detector 28.

The AC power input signal is applied across AC power input terminals 160 and 54. The neutral terminal 54 can be coupled to one of the terminals 40 or 42 of AC control signal input 37. A series combination of a 0.068 microfarad capacitor 162 and a 39 ohm resistor 164 is connected across AC power input terminals 160, 54. The AC power input signal is connected to the AC input terminals 166, 168 of a full-wave bridge rectifier circuit 170. The negative output 172 of bridge rectifier 170 is connected to ground. The positive output 174 of bridge rectifier 170 is coupled to several subcircuits.

Positive output 174 of bridge rectifier 170 is coupled directly to power supply terminal 148 of relay coil 38, providing it with a pulsating DC voltage sufficient to activate relay 22.

Positive output 174 of bridge rectifier 170 is also coupled to a series voltage divider circuit 176, comprised of a forty-seven kilohm resistor 178, a twenty kilohm resistor 180 and a ten kilohm resistor 182. The voltage appearing across ten kilohm resistor 182 is thus approximately one-eighth the output voltage from bridge rectifier 170. This lower voltage, time-varying signal is fed to the input of zero-cross detector circuit 28.

Finally, positive output 174 of bridge rectifier 170 is fed to the power supply's regulator circuits 184. The first regulator circuit is a 15 volt preregulator 186 that uses a 1N5245 15 volt Zener diode 188 and a TIP48 pass transistor 190. The positive output 174 of bridge rectifier 170 is connected to the collector terminal 192 of transistor 190. The base of transistor 190 is connected to ground through Zener diode 188. The anode 196 of Zener diode 188 is connected to ground.

The output of preregulator stage 186 is taken from the emitter of transistor 190 and is connected to the anode 200 of a 1N4005 diode 202. The cathode 204 of diode 202 is shunted to ground by a 4.7 microfarad tantalum-dipped filter capacitor 206 and is connected to the anode 208 of a green light-emitting diode 210. The cathode 212 of light-emitting diode 210 is connected to the input terminal 214 of a five volt 78LO5 regulator 216. Light-emitting diode 210 serves to indicate the presence of power in power supply 34. The ground terminal 218 of regulator 216 is grounded. The output terminal 220 of regulator 216 is shunted to ground by a 0.01 microfarad filter capacitor 222. Output terminal 220 supplied a regulated five volt signal to five volt power line 82 which powers the system's integrated circuits.

Power-Up Reset Pulse Generator

Power-up reset pulse generator 32 acts to deenergize relay 22 when power is first applied. It thus prevents damage to the equipment powered through relay 22 caused by high voltage transients on the power signal. The power-up reset feature also prevents harm to persons servicing the equipment caused by the unexpected application of power. Power-up reset pulse generator 32 operates from output 220 of regulator 216.

Connected across output 220 of regulator 216 is a pair of series-connected 1N4148 diodes 224, 226. the anode 228 of diode 226 is connected to ground. The cathode 230 of diode 224 is connected to output terminal 220 of regulator 216. The junction 231 between diodes 224 and 226 is connected to the input 232 of a HC14 CMOS Schmitt-trigger inverter 234. Input 232 of inverter 234 is also connected to ground through 1.5 microfarad tantalum-dipped electrolytic capacitor 236 and is connected to five volt power line 82 through a 100 kilohm resistor 238.

When no power is applied to the power-up reset pulse generator circuit 32, input 232 and output 240 of inverter 234 are both at a logic low state. When power is initially applied, input 232 is momentarily held at a logic low level while capacitor 236 charges. This logic low input signal causes a logic high output signal to appear on output 240 of inverter 234. This logic high output signal is coupled to clear inputs 118 and 128 of flip-flop circuits 26 and 30, and serves to clear their Q outputs 112, 124 to a logic low level. As capacitor 236 charges, input 232 of inverter 234 will rise to a logic high level, causing output 240 to fall to a logic low. The pulse applied to clear inputs 118 and 128 of flip-flops 26 and 30 thus terminates.

Applying a high-level pulse to clear inputs 118 and 128 of toggle flip-flop 30 and zero-cross flip-flop 26 causes the Q outputs 112 and 124 of these stages to go to a logic low level. The not-Q outputs 114 and 130 go to a logic high level. Flip-flops 26 and 30 are thus preset so that the next pulse provided to input 110 of toggle flip-flop 30 will cause relay coil 38 to energize.

Zero-Cross Detector

Zero-cross detector 28 detects the zero-crossing of the AC power signal and produces a corresponding output signal. This output signal causes zero-cross flip-flop 26 to gate the signal present on its D input 122 to its Q output 124, thereby synchronizing system switching with the zero-crossings of the AC power system.

As discussed above, the input of zero-cross detector 28 is derived from series voltage divided circuit 176 connected across unfiltered positive output terminal 174 of full-wave bridge rectifier 170. The time-varying signal on positive output 174, and correspondingly across resistor 182, falls to zero every time the AC power input signal has zero-crossing. This time-varying signal is fed to the input 242 of a HC14 CMOS Schmitt-trigger inverter 244, which responds to a zero voltage on input 242 by providing a logic high level signal on its output 246. Each time the AC power signal crosses zero, input 242 of inverter 244 falls pulses is generated, each pulse corresponding to a low, causing output 246 to go high. Thus, a train of zero-crossing of the AC signal. This pulse train is fed to clock (T) input 126 of zero-cross flip-flop 26, causing it to gate the toggle flip-flop output signal present at its D input 122 to its Q output 124.

As noted earlier, it sometimes is important that AC power switching of indutrial equipment occur precisely at the AC signal's zero-crossing point. Such precise synchronization requires that the relay's pull-in delay be canceled by anticipatorily activating the relay coil driver circuit 24 before the actual zero-crossing. This anticipation is achieved in the preferred embodiment by appropriate selection of resistors 178, 180 and 182 comprising series voltage divider circuit 176.

Inverter 224, which signals zero-crossings of the AC power signal, provides a logic high output signal when the voltage applied to input 242 drops below approximately one volt. Resistors 178, 180 and 182 should be selected so that the input signal to inverter 244 crosses this one volt threshold before the actual zero-crossing of the AC signal by an amount of time equal to the pull-in delay of relay 22. For example, if the relay pull-in delay is two milliseconds, resistors 178, 180 and 182 should be selected so that voltage divider circuit 176 has one volt output across resistor 182 two milliseconds before the actual zero-crossing.

Preferred Construction

Figure 4:
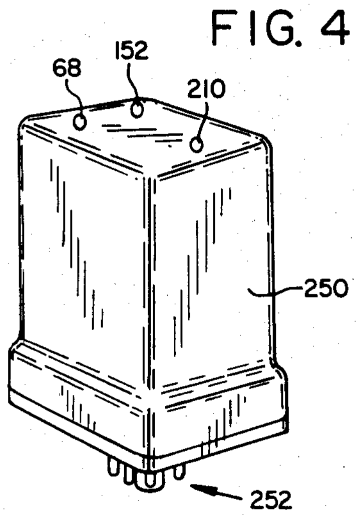
FIG. 4 is a perspective view of a preferred construction of an impulse-operated relay device embodying the present invention.
Figure 5:
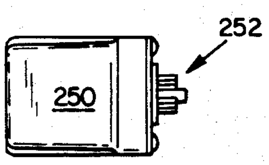
FIG. 5 is a side view of the device of FIG. 4.
Figure 5A:
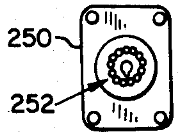
FIG. 5a is a connector-end view of the device of FIG. 4.
Figure 6:
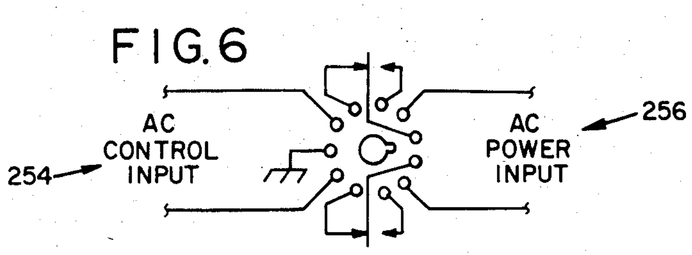
FIG. 6 is a schematic diagram of the pin-out of the device of FIG. 4.

The preferred construction of impulse relay control circuit 20 of the present invention is shown in FIGS. 4, 5, **5*a* and 6. The relay and its associated control circuitry is constructed within a plastic enclosure 250 designed to plug into a standard relay socket. Light-emitting diodes 210, 68 and 152, used to indicate power, impulse and relay-on, are mounted on the top of enclosure 250. The base 252 of enclosure 250 used in the preferred construction is an eleven-pin keyed plug of the type typically used with industrial double-pole, double-throw relays. The pin-out pattern of base 252 corresponds to the pin-out of most such eleven-pin relay plugs, with the exception that the AC control input 254 is substituted for the usual coil input. The AC power input 256** to the system is fed to two normally unused pins. Such construction facilitates substitution of the impulse relay of the present invention for standard double-pole, double-throw relays used in the prior art with a minimum of circuit modification.

APPLICATIONS

Single Switch Motor Control

Figure 7:
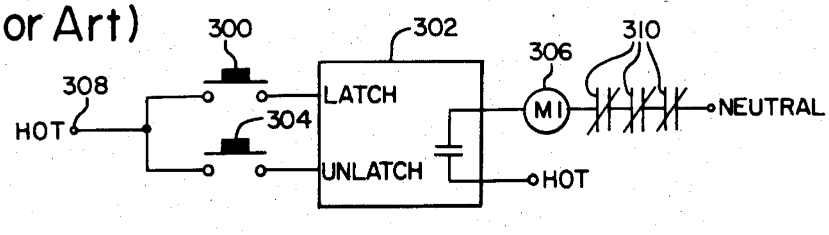
FIG. 7 (Prior Art)
FIG. 7 is a schematic diagram of a motor control circuit using a magnetic latching relay of the prior art.

In the prior art, latching relays controlled by two momentary contact switches have been used to control industrial circuits. Such an arrangement is shown in FIG. 7. If momemtary contact switch 300 is operated, a latching relay 302 will energize and latch in its energized state. If momentary contact switch 304 is operated, latching relay 302 will unlatch and remain in its unlatched state. A load such as a motor 306 can be connected to its power source 308 through latching relay 302 and through various interlock switches 310, and is accordingly energized or deenergized corresponding to the state of relay 302. If power is lost to latching relay 302 and subsequently restored, the relay will assume its last state. In many applications this is undersirable or dangerous.

Figure 8:
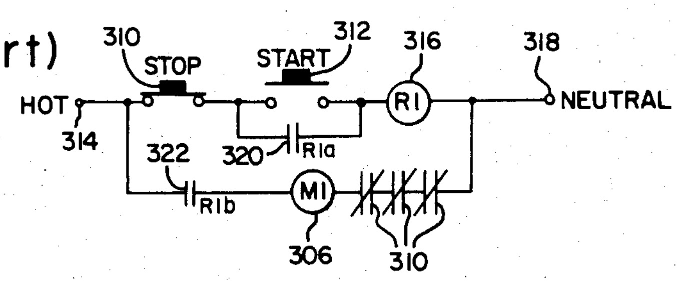
FIG. 8 (Prior Art)
FIG. 8 is a schematic diagram of a motor control circuit using a self-sealing relay contact of the prior art.
Figure 8A:
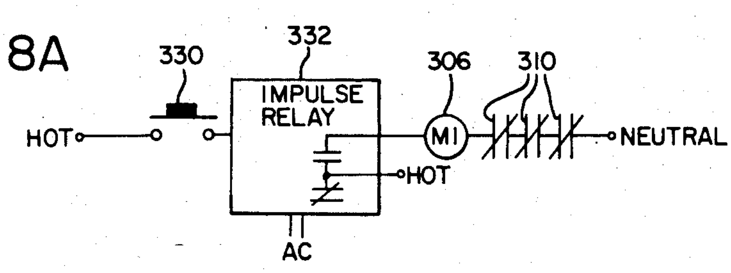
FIG. 8a is a schematic diagram of an improved motor control circuit incorporating the impulse-operated relay of FIG. 1 according to the present invention.

An alternative arrangement used in the prior art uses a relay with self-sealing contacts. Such an embodiment is shown in FIG. 8. The momentary contact stop switch 310 is normally closed, while the momentary contact start switch 312 is normally open. When start switch 312 is momentarily closed, current flows from the hot AC terminal 314 through the closed stop and start switches 310, 312, and through the relay coil 316 to the neutral terminal 318, thereby causing relay coil 316 to energize. The relay contacts 320 shunted across start switch 312 thus close, maintaining the completed relay coil circuit even after start switch 312 is released. Load 306 controlled by the relay contact 322 remains activated until stop switch 310 is momentarily depressed, thereby interrupting current flow through relay coil 316 and opening relay contacts 320 across start switch 312. Such a self-sealing relay system has the advantage that the relay coil 316 is uneneregized when power is first applied.

When used in the same application, the impulse relay of the present invention requires only a single momentary contact switch 330 and automatically resets the circuit in the event that power is lost, as shown in FIG. 8. When AC power is first applied, impulse relay 332 will be unenergized and motor 306 will be idle. If switch 330 is momentarily closed, impulse relay 332 will energize, causing motor 306 to operate. If switch 330 is again momentarily closed, impulse relay 332 will then deenergize, causing motor 306 again to be idle. All switching of motor 306 by impulse relay 332 is done in synchronization with the zero-crossings of the Ac power signal.

Multi-Way Light Switch

Figure 9:
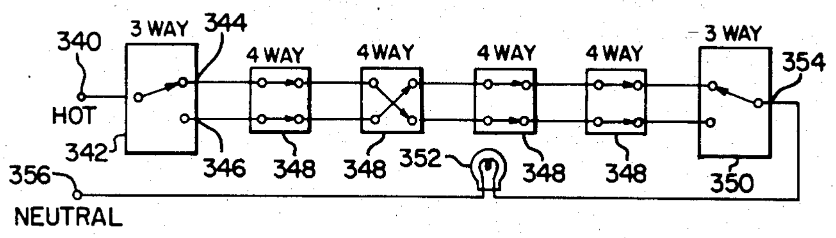
FIG. 9 (Prior Art)
FIG. 9 is a schematic diagram of a prior art multiswitch light system.
Figure 9A:
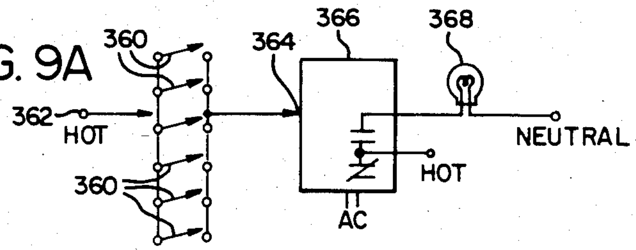
FIG. 9a is a schematic diagram of an improved multiswitch light system incorporating an impulse-operated relay system of the present invention.

In the prior art, a plurality of expensive switches have been needed to control a light from a plurality of locations. A typcial arrangement of such a system is shown in FIG. 9. An AC hot line 340 is connected to a three-way switch 342, which connect the AC hot to one of two outputs 344 or 346. These outputs 344 and 346 are fed to a plurality of four-way switches 348, the last one of which is again connected through a three-way switch 350. The light bulb 352 is connected between the common terminal 354 of three-way switch 350 and the neutral line 356. Operation of any of the switches to its opposite position causes light 352 to change state.

The cost of four-way switches 348 becomes prohibitive in large installations, as does the necessity for running four wires to each switch.

The impulse relay of the present invention may be employed to advantage in such a system, as shown in FIG. *9a*. Instead of the expensive four-way switches of the prior art, this embodiment uses readily-available single-pole, single-throw momentary contact switches 360. Each switch is connected to only two wires. Momentary activation of any of switches 360 sends an AC control signal from the AC hot line 362 to the control signal input 364 of impulse relay 366. Any such momentary activation causes impulse relay 366 to change state, thereby energizing or deenergizing the light bulb 368.

Conveyor Control From a Plurality of Locations

Figure 10:
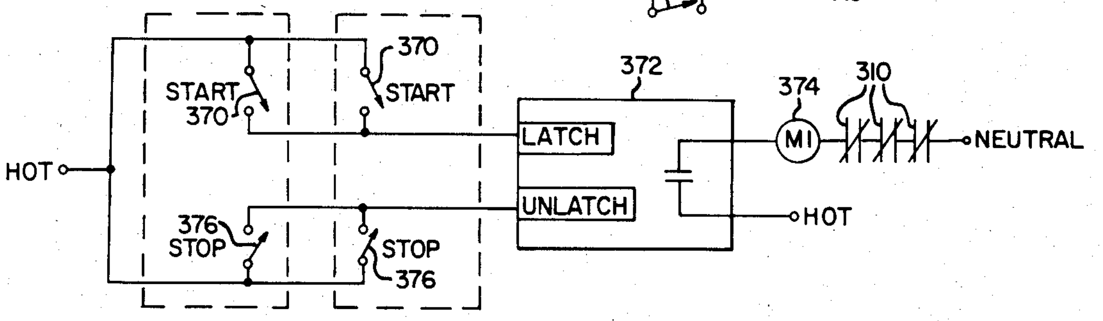
FIG. 10 (Prior Art)
FIG. 10 is a schematic diagram of a motor control system operated by two foot switches as known in the prior art.

In certain process control applications, a device such as a conveyor needs to be controlled by two or more operators, each having the ability independently to start and stop the device. The prior art systems for implementing such a function uses latching relays and separate START and STOP foot switches for each operator. Such a system is shown in FIG. 10. If any one of the START foot switches 370 is activated, latching relay 372 latches ON, energizing the conveyor motor 374. If any one of the STOP foot switches 376 is activated, latching relay 372 latches OFF, deenergizing conveyor motor 374. Such a system is expensive to implement due to the multiplicity of switches. Furthermore, the relay's power-up state is the same as its power-off state, permitting unexpected activation of conveyor motor 374 when power is first applied.

Figure 10A:
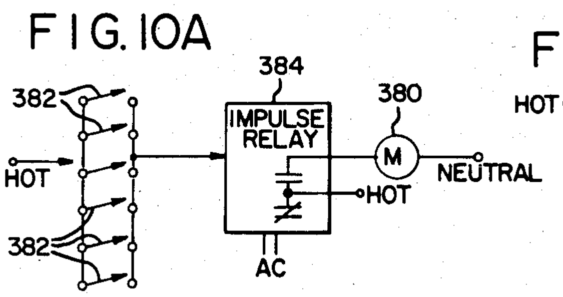
FIG. 10a is a schematic diagram of an improved motor control circuit incorporating the impulse-operated relay system of the present invention.

The same control function can be implemented using the impulse relay of the present invention with just a single foot switch per operator, as is shown in FIG. 10*a*. Each operator of the conveyor or other device can independently start and stop the conveyor motor 380 by momentary operation of their single foot switch 382. Each operation of a foot switch 382 toggles impulse relay 384, thereby alternately starting and stopping conveyor motor 380. Such an implementation offers the additional advantages of starting and stopping conveyor motor 380 only at the zero-crossings of the AC power signal and deenergizing conveyor motor 380 when power is first applied to the system.

Reversing Circuit

In certain industrial applications it is necessary alternately to use two motors to move a system in alternating directions. Typically a forward motor and a reverse motor with associated end-of-travel limit switches are used. Prior art methods of controlling the operation of such motors require at least three relays, in addition to separate start and stop buttons. Such a prior art system is shown in FIG. 11.

Figure 11:
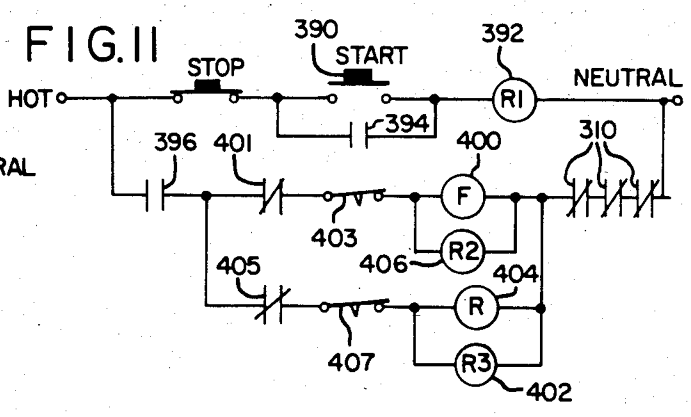
FIG. 11 is a schematic diagram of a prior art control circuit for a two-motor reversible system.

With reference to FIG. 11, a self-sealing relay contact system similar to that shown in FIG. 8 is provided to switch power to the reversible system. When the normally open START switch 390 is closed, a relay coil 392 is energized, thereby closing relay contacts 394 and 396. Relay contact 394 sustains current flow through relay coil 392 after START switch 390 is reopened. Relay coil 392 remains energized until the STOP switch 398 is momentarily opened.

A forward motor 400 is powered through the normally closed contacts 401 of a relay 402 and through a normally closed limit switch 403. A relay coil 406 is connected in parallel with Forward motor 400 and is similarly powered.

A reverse motor 404 is powered through the normally open contacts 405 of relay 406 and through a normally closed limit switch 407. Relay coil 402 is connected in parallel with Reverse motor 404 and is similarly powered.

When power is first applied to the system, relay coils 402 and 406 race to energize. Assuming relay coil 406 energizes first, relay contact 405 will open, removing power from Reversing motor 404 and relay coil 402. Forward motor 400 will operate until limit switch 403 is momentarily opened. When limit switch 403 momentarily opens, forward motor 400 stops and relay coil 406 is deenergized.

When relay coil 406 is deenergized, relay contact 405 returns to its normally closed state. The circuit powering Reverse motor 404 and relay coil 402 is thereby completed, causing Reverse motor 404 to operate and relay coil 402 to energize. The energized relay coil 402 causes relay contacts 401 to open, preventing power from reaching Forward motor 400 and relay coil 406 even after limit switch 403 returns to its normally closed position.

The system thus alternately operates each motor until the associated limit switch is operated, at which time the other motor is operated. The initial race between relay coils 402 and 406 to energize first can be prevented by the addition of a fourth relay and additional circuitry.

Figure 11A:
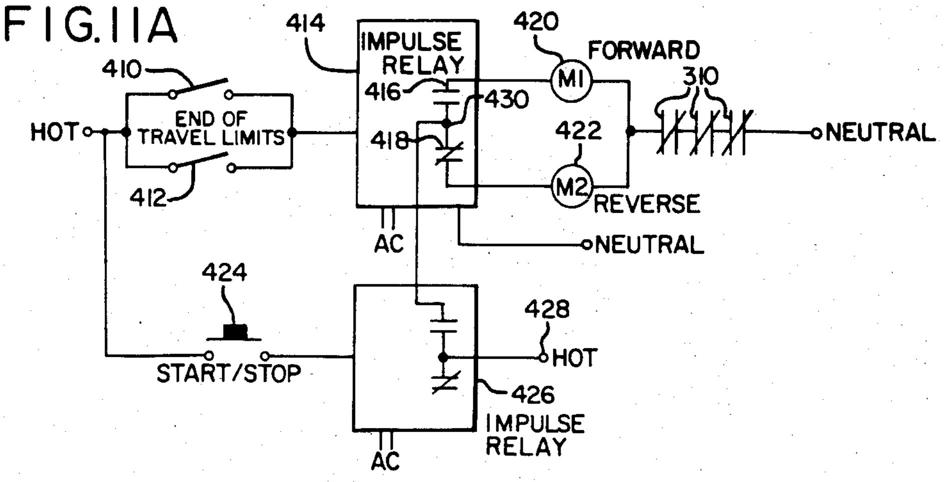
FIG. 11a is a schematic diagram of an improved control circuit for a two-motor reversible system incorporating the impulse-operated relay system of the present invention.

By using two impulse relays of the present invention, this same motor reversing function can be implemented more simply and reliably. In the embodiment shown in FIG. 11*a*, the normally-open end-of-travel limit switches 410 and 412 are connected in parallel. Momentary closure of either switch causes a first impulse relay 414 to change state. In this embodiment both the normally-open contacts 416 and the normally-closed contacts 418 of first impulse relay 414 are used, one driving the Forward motor 420 and one driving the Reverse motor 422. When an end-of-travel limit switch 410 or 412 is activated, the motor that is operating is deenergized and the motor that was deenergized is energized.

A normally open momentary contact switch 424 controls a second impulse relay 426, which connects the AC hot line 428 to the common contact 430 of the first impulse relay. The second impulse relay 426 insures that neither motor runs on power-up. Thus, accidental start-up of the equipment when the AC power is first restored after having been interrupted is eliminated.

Having described and illustrated the principles of my invention and preferred embodiments, it should be apparent to those skilled in the art that the invention may be modified in arrangement and detail without departing from such principles. I claim all modifications coming within the scope and spirit of the following claims.

I claim:

1. An impulse relay control circuit for controlling a relay powered by an interruptable power signal, comprising:
  - means connectable to a power line for inputting the power signal to the circuit;
  - reset means for generatring a reset pulse signal in response to an initiation of the power signal on the power line;
  - means for inputting an AC impulse control signal to the circuit;
  - logic means responsive to successive occurrences of the AC impulse control signal for alternately generating first and second logic signals;
  - relay energizing means responsive to the first and second logic signals for energizing and deenergizing the relay; and
  - initializing means responsive to the reset pulse signal for initially applying said second logic signal to the relay energizing means to deenergize the relay;
  - the logic means including preset means responsive to the reset signal for presetting the logic means so that the first logic signal following initiation of the power signal energizes the relay.

2. A relay control circuit according to claim 1 in which the logic means includes clock means responsive to the AC power signal for generating a clock signal in a predetermined phase relationship with the AC power signal;
  - gate means responsive to the clock signal for gating the first and second logic signals from the logic means to the relay energizing means, thereby to actuate the relay in accordance with said predetermined phase relationship.

3. A circuit according to claim 2 in which the clock means is a zero detector circuit means responsive to the AC power signal for producing a clock pulse upon each zero-crossing of the AC power signal and the gate means is operable to gate one of the logic signals to the relay energizing means upon a next zero-crossing of the AC power signal, thereby to actuate the relay substantially in phase with the next zero crossing.

4. An impulse relay control circuit for controlling a relay powered by an AC power signal and switchable between energized and deenergized states, comprising:
  - means connectable to an AC power line for inputting the AC power signal to the circuit;
  - reset means for generating a reset pulse signal in response to an initiation of the AC power signal on the AC power line;
  - initialization means responsive to the reset pulse signal for initially setting the relay to a first predetermined state;
  - means for inputting an AC impulse control signal to the circuit;
  - logic means responsive to successive occurrences of the AC impulse control system for alternately generating first and second logic signals; and relay energizing means responsive to the first logic signals for switching the relay from the first state to the second state and responsive to the second control signal for switching the relay from the second state to the first state.

5. An impulse relay control circuit according to claim 4 in which the reset means includes:
  - a DC power supply having an output, the DC power supply being operable from the AC power signal; and
  - an inverter having a power input coupled to the DC power supply output, the inverter further having an input coupled to the DC power supply output through a paralleled back-biased diode and resistor combination, the inverter input being coupled to ground through a paralleled back-biased diode and capacitor combination, and the inverter further having an input for providing the reset pulse signal in response to the initiation of the AC power siganl on the AC power line.

6. An impulse relay control circuit according to claim 5 in which the logic means includes a flip-flop having an output connected to the relay energizing means, the flip-flop being configured as a shift register stage, the initialization means including clear means in the flip-flop responsive to the reset pulse signal for clearing the output of the flip-flop to cause the energizing means to set the relay to said first predetermined state.

7. The circuit according to claim 4 including clocking means for transmitting a clock signal to the logic means; the logic means being responsive to the clock signal to gate successive first and second logic signals to the relay energizing means.

8. An impulse relay control circuit according to claim 7 in which the logic means includes:

first flip-flop means configured as a shift register, the flip-flop means having an output and having T, D and clear inputs, the clear input being connected to the output of the reset means for clearing the output of the first flip-flop means in response to a reset pulse signal from the reset means and thereby providing said initialization means, the T input being coupled to the clocking means, and the output of the first flip-flop being connected to the relay energizing means; and second flip-flop means having Q and non-Q outputs and having clear, D and T inputs, one of said outputs being coupled to the D input of the first flip-flop, the clear input being connected to the output of the reset means for clearing the outputs of the second flip-flop means and the T input being coupled to the means for inputting the AC impulse control signal to the circuit.

9. An impulse relay control circuit according to claim 8 in which the not-Q output of the seond flip-flop is coupled to its D input, whereby clearing the second flip-flop by the reset means couples the logic high level on the not-Q output back to the D input, so that the Q output of the second flip-flop is preset to toggle high at the next occurrence of an AC impulse control signal.

10. A circuit according to claim 7 in which the logic means includes a flip-flop having T and D inputs, the flip-flop being configured as a shift register stage, the T input being coupled to the clocking means and the D input being coupled to the means for inputting the AC control signal.

11. An impulse relay control circuit for controlling a relay powered by an AC power signal, comprising:

means connectable to an AC power line for inputting the AC power signal to the circuit;

means for inputting an AC impulse control signal to the circuit;

logic means responsive to successive occurrence of the AC impulse control system for alternately providing first and second logic signals;

clock means responsive to the AC power signal for generating a clock signal in a predetermined phase relationship with the AC power signal;

gate means responsive to the clock signal for gating the first and second logic signals from the logic means to the relay energizing means; and relay energizing means responsive to the first and second logic signals for energizing and deenergizing the relay in accordance with said phase relationship to the AC power signal.

12. An impulse relay control circuit according to claim 11 including:

reset means responsive to the initiation of the AC power signal for generating a reset pulse signal; and initializing means responsive to the reset pulse signal for initially deenergizing the relay.

13. A circuit according to claim 11 in which the clock means is a zero detector circuit means responsive to the AC power signal for producing a clock pulse upon each zero-crossing of the AC power signal and the gate means is operable to gate one of the logic signals to the relay energizing means at the next zero-crossing of the AC power signal, thereby to actuate the relay substantially in phase with the next zero-crossing.

14. A circuit according to claim 13 in which the zero detector circuit means includes a threshold detector means for anticipatorily detecting an AC power signal zero-crossing by detecting a drop in the magnitude of the AC power signal below a predetermined threshold value.

15. A control system for operting an electrical device from an AC power signal, comprising:

means connected to an AC power line for inputting the AC power signal to the system;

electrically-actuable power switching means for coupling the AC power signal to the electrical device;

switch means for switchably connecting an AC impulse control signal to a single control signal output line;

a logic means connected to said single control signal output line and responsive to successive applications of the AC impulse control signal by said switch means for transmitting two-state logic control signals; and operating means responsive to the two-state logic control signals for successively actuating and deactuating the electrically-actuable power switching means;

the logic means including means responsive to the AC impulse control signal on the control signal output line for producing an output pulse for each application of the AC impulse control signal and flip-flop means responsive to each output pulse for producing an alternate one of said two state logic signals upon each pulse.

16. A control system for operating an electrical device from an AC power signal, the AC power signal being interruptable, comprising:

means connected to an AC power line for inputting the AC power signal to the system;

electrically-actuable power switching means for coupling the AC power signal to the electrical device;

switch means for switchably connecting an AC impulse control signal to a single control signal output line;

a logic means connected to said single control signal output line and responsive to successive applications of the AC impulse control signal by said switch means for transmitting two-state logic control signals;

operating means responsive to the two-state logic control signals for successively actuating and deactuating the electrically-actuable power switching means; and means for actuating the electrically-actuable power switching means initially to decouple the device from AC power when the AC power signal is first restored after having been interrupted.

17. A system according to claim 16 in which the logic means further comprises synchronizing means for synchronizing transmission of each logic control signal with the next zero-crossing of the AC power signal.

18. A system according to claim 15 in which the switch means includes at least two independent switch means connected to said single control signal output line, the logic means being responsive to successive applications of the impulse control signal by any one of said switch means for transmitting said two state logic control signals.

* * * * *

UNITED STATES PATENT AND TRADEMARK OFFICE
CERTIFICATE OF CORRECTION

PATENT NO. : 4,631,627

DATED : December 23, 1986

INVENTOR(S) : Ronald E. Morgan

It is certified that error appears in the above-identified patent and that said Letters Patent is hereby corrected as shown below:

Column 1, line 45, "Ac" should be --AC--;
Column 5, line 20, "initiationof" should be --initiation of--;
Column 5, line 31, "as" should be --a--;
Column 8, line 24, "tne" should be --the--;
Column 9, line 16, "supplied" should be --supplies--;
Column 10, line 2, "divided" should be --divider--;
Column 10, line 7, "has zero-crossing." should be --has a zero-crossing.--;
Column 10, lines 12-13, delete "pulses is generated, each pulse corresponding to a";
Column 10, line 14, insert before zero-crossing --pulses is generated, each pulse corresponding to a--;
Column 10, line 19, "indutrial" should be --industrial--;
Column 10, line 27, "224," should be --244,--;
Column 10, line 67, "momemtary" should be --momentary--;
Column 11, line 10, "undersirable" should be --undesirable--;

UNITED STATES PATENT AND TRADEMARK OFFICE
CERTIFICATE OF CORRECTION

PATENT NO. : 4,631,627

DATED : December 23, 1986

INVENTOR(S) : Ronald E. Morgan

It is certified that error appears in the above-identified patent and that said Letters Patent is hereby corrected as shown below:

Column 11, line 28, "uneneregized" should be --unenergized--;
Column 11, line 41, "Ac" should be --AC--;
Column 11, line 47, "typcial" should be --typical--;
Column 11, line 49, "connect" should be --connects--;
Column 14, line 18, "zero crossing." should be --zero-crossing.--;
Column 14, line 53, "input" should be --output--;
Column 15, line 13, "non-Q" should be --not-Q--;
Column 15, line 22, "seond" should be --second--;
Column 15, line 40, "occurrence" should be --occurrences--.

Signed and Sealed this

Fifteenth Day of December, 1987

*Attest:*

DONALD J. QUIGG

*Attesting Officer* — *Commissioner of Patents and Trademarks*